United States Patent
Dawes et al.

(10) Patent No.: US 8,454,885 B2
(45) Date of Patent: Jun. 4, 2013

(54) METHOD FOR MAKING FUSED CERAMIC ARTICLES OF NEAR NET SHAPE

(75) Inventors: Steven Bruce Dawes, Corning, NY (US); Michael Thomas Gallagher, Corning, NY (US); Keith Leonard House, Corning, NY (US)

(73) Assignee: Corning Incorporated, Corning, NY (US)

( * ) Notice: Subject to any disclaimer, the term of this patent is extended or adjusted under 35 U.S.C. 154(b) by 1420 days.

(21) Appl. No.: 12/121,223

(22) Filed: May 15, 2008

(65) Prior Publication Data

US 2012/0177831 A1 Jul. 12, 2012

(51) Int. Cl.
| | | |
|---|---|---|
| *B29C 44/04* | (2006.01) | |
| *B32B 18/00* | (2006.01) | |
| *C03C 6/00* | (2006.01) | |
| *C04B 35/195* | (2006.01) | |
| *B28B 1/00* | (2006.01) | |
| *B28B 3/00* | (2006.01) | |
| *B28B 5/00* | (2006.01) | |

(52) U.S. Cl.
USPC ........... 264/621; 264/643; 264/658; 264/660; 264/669; 264/681

(58) Field of Classification Search
None
See application file for complete search history.

(56) References Cited

U.S. PATENT DOCUMENTS

| | | | |
|---|---|---|---|
| 5,017,526 A | 5/1991 | Newkirk et al. | |
| 5,478,785 A * | 12/1995 | Glass et al. | 427/228 |
| 5,641,817 A | 6/1997 | Aghajanian et al. | |
| 5,667,742 A | 9/1997 | Dwivedi et al. | |
| 5,676,745 A | 10/1997 | Kelly et al. | |
| 5,738,817 A | 4/1998 | Danforth et al. | |
| 6,012,304 A * | 1/2000 | Loxley et al. | 65/111 |
| 6,228,437 B1 * | 5/2001 | Schmidt | 427/559 |
| 6,277,440 B1 * | 8/2001 | Reynolds | 427/226 |
| 6,773,657 B2 * | 8/2004 | Beall et al. | 264/628 |
| 7,332,537 B2 | 2/2008 | Bredt et al. | |
| 2001/0036516 A1 * | 11/2001 | Schmidt | 427/559 |
| 2004/0051196 A1 * | 3/2004 | Otsuka et al. | 264/41 |
| 2004/0087443 A1 * | 5/2004 | Tamura | 502/439 |
| 2005/0113614 A1 * | 5/2005 | Lowe et al. | 585/259 |
| 2005/0255239 A1 * | 11/2005 | Zhu et al. | 427/226 |
| 2006/0230984 A1 | 10/2006 | Bredt et al. | |
| 2008/0118894 A1 * | 5/2008 | Rothbrust et al. | 433/215 |

OTHER PUBLICATIONS

Dey et al; "Near-Net-Shape Fibre-Reinforced Ceramic Matrix Composites by the Sol Infiltration Technique"; Science Direct, Materials Letters 57 (2003) 2919-2926.

* cited by examiner

*Primary Examiner* — Christina Johnson
*Assistant Examiner* — Lisa Herring
(74) *Attorney, Agent, or Firm* — Robert P. Santandrea (57) ABSTRACT

The invention is a solution impregnation and drying treatment that imparts a high temperature binder into an already formed porous green body composed of particulate batch material. The batch material includes inorganic compounds and binder. The result is reduced sag and distortion and the same or increased strength when the porous body is later fused during sintering/firing.

20 Claims, 4 Drawing Sheets

METHOD FOR MAKING FUSED CERAMIC ARTICLES OF NEAR NET SHAPE

FIELD OF THE INVENTION

The present invention pertains to the field of binders used to form fused ceramic articles.

BACKGROUND

Many processes for forming fused ceramic bodies begin by forming porous green bodies, which are composed of a batch material that includes particulates of inorganic compounds held together with binders. One of the final steps in these processes is a firing step in which the original particulates are reacted to become a fused ceramic body. Often all or most of the binders burn out in this firing step. These processes have constraints, including green bodies with large particulates and large pores (e.g., greater than 10 microns average size), that experience high sag in firing due to a low ratio of sintering forces relative to gravity forces. Green bodies that have high porosity can have very low strength in firing and will often fracture or crumble before particles fuse.

One approach taken to address the above constraints is adding one or more high temperature binders to the material mixture of the body prior to forming the body. An organometallic pre-ceramic precursor binder can be added to the batch material, which is formed into the green pre-formed bodies. The ceramic precursor binders contribute to the overall ceramic content of the finished part. In another approach, a pre-formed green body can be heated to burn out traditional binder and then infiltrated with a pre-ceramic organic or inorganic binder material that can be a monomer, oligomer or polymer in a solvent. This binder can include an organometallic material.

Sol gel materials have been made, for example, using metal alkoxides or metal salts, organic solvents and acid or base catalysts. While much interest in these materials was generated when they were first developed decades ago, glass or crystalline bodies formed using sol gel materials were expensive and difficult to process. For example, the drying step used to prepare monolithic fused glass bodies was carried out by very slow drying or expensive supercritical drying. As a result of the difficulties of using sol gels to form large monolithic bodies, sol gel technology has been applied to areas including thin films and fiber coating. For example, ceramic matrix composites can be made by infiltrating fiber performs with ceramic sols to form a ceramic matrix material.

SUMMARY

The present invention uses an impregnation and drying treatment that adds high temperature binder material to an already formed porous green body or pre-form. The green body is composed of a particulate batch material. The batch material includes inorganic compounds that are capable of forming ceramic crystalline or glass phases, and binder material. The pre-formed green body used in the inventive method has a shape that is retained when the body is later fired and transformed into a fused ceramic (i.e., the inventive method produces fused ceramic articles of near net shape). In general, the inventive treatment is characterized by two steps: 1) the formed porous green body is infiltrated with a homogeneous sol gel precursor solution to fill the pores of the green body with the solution, and 2) the infiltrated body is dried to concentrate the solution and then polymerize the concentrated solution. The treatment can then proceed to firing. Alternatively, the impregnation and drying can be repeated one or more times before firing.

The sol-gel precursor infiltrating solution is a mixture of monomers and oligomers formed by reacting pre-ceramic organometallic compounds or pre-ceramic metal salts and organic solvent in the presence of an acid catalyst. The porous green bodies can be infiltrated by being submerged in the infiltrating solution. The infiltrated bodies are removed from the solution and dried to remove the solvent and then to form a polymer of the pre-ceramic compound in the infiltrated bodies. The dried bodies are fired at a temperature to form fused ceramic articles, for example, substrates for catalytic converters, flow mixers for fluid streams, and filters for filtration of liquids.

One embodiment of the present invention features providing shaped porous green bodies of particulate batch material. The batch material includes inorganic source compounds and binder. An infiltrating solution which is a sol gel precursor mixture of monomers and oligomers, is formed by reacting pre-ceramic organometallic compounds or pre-ceramic metal salts and organic solvent in the presence of an acid catalyst. The porous green bodies are infiltrated with the infiltrating solution to fill the pores of the green bodies with the infiltrating solution. The infiltrated bodies are dried to remove most of the solvent and then to form a polymer of the pre-ceramic compound in the bodies. The dried bodies are fired at a temperature to form fused ceramic articles that include first ceramic material derived from the inorganic source compounds fused with second ceramic material derived from the pre-ceramic compound.

Referring now to more specific features of the inventive method, the infiltrating solution employs the pre-ceramic compound in an amount effective to enable the second ceramic material to comprise 2-20%, in particular 5-10% by weight, of each ceramic article. The pores can be filled with the infiltrating solution without applying pressure by submerging the porous bodies in the infiltrating solution for not more than 1 minute. The infiltrating (e.g., submerging) step is conducted on the room temperature porous green bodies that have not been heated above 150° C. During the drying step the polymer can be formed in necking regions between contiguous particles and in small pores of the infiltrated bodies. The submerging and drying steps can be carried out at least two times, which may further reduce sagging and shrinkage of the fired bodies.

As to the specific aspects of the composition of the sol gel precursor solution, the organometallic compounds may include, but are not limited to, at least one metal alkoxide such as, but not limited to, magnesium alkoxide, aluminum alkoxide, zirconium alkoxide, phosphorous alkoxide, titanium alkoxide, niobium alkoxide, tantalum alkoxide, and the like. Alternatively, the organometallic compounds may include boron alkoxide, silicon alkoxide, and/or phosphorous alkoxide. The metal salts include, but are not limited to, at least one of magnesium nitrate, lithium nitrate, calcium nitrate hydrate, yttrium nitrate hydrate, and the like. The solvent includes at least one of 2-methoxyethanol, ethanol and n-propyl alcohol. The acid catalyst is an aqueous nitric acid solution containing 60-85 weight % nitric acid.

The inventive method results in characteristic properties. Most notably, strength of the fused articles is maintained while reducing distortion during sintering/firing as defined below. The impregnation and drying treatments can be effective in both improving fused body strength and in reducing sag that develops during sintering/firing. The treatment is simple and fast, and creates fused ceramic bodies of near-netshape and of high porosity. More specifically, the ceramic articles and the porous bodies can have a porosity ranging from 40 to 70% by volume. The firing can decrease the volume of the porous green bodies by not more than 30% and, in particular, by not more than 15%. A material bend strength of the ceramic articles is at least 40% greater and, in particular embodiments, at least 300% greater, than a material bend strength of ceramic articles produced without the submerging and drying steps. The sagging of the ceramic articles is at least 2 times less than sagging of ceramic articles produced without the submerging and drying steps. Distortion (as defined below) and linear shrinkage of the ceramic articles are each not more than 5%.

As used herein, the term "ceramic" refers to any metal oxides (e.g., silica) and non-oxides of metals (e.g., metal carbides, metal nitrides and mixtures of these) in crystalline or non-crystalline states. This includes glasses and glass ceramics and materials such as alumina, quartz, silicon carbide, aluminum titanate, and so on. The term "sintering/firing" used herein means firing at a sufficient temperature such that particles of the batch material partially fuse together. Reference to fused ceramics means the articles resulting from the sintering/firing. Reference to pre-ceramic compounds means those materials used in the sol-gel precursor solution that form fused ceramic material upon sintering/firing. A green body is defined herein as a ceramic composite composed of batch material formed into a shape and in which ceramic particles are not fused. Unless otherwise stated, the term "polymer" as used herein refers to a material having a network of metal-oxygen-metal bonds formed by hydrolysis and condensation of organometallic precursors. As used herein, the term "distortion" means non-sagging change in geometric ratio of dimensions that occurs in a fused ceramic article compared to a dried ceramic pre-form (such as change in the ratio of diameter/length of a cylinder or change in the ratio of diameter in x direction/diameter in y direction of a cylinder).

Many additional features, advantages and a fuller understanding of the invention will be had from the accompanying drawings and the detailed description that follows. It should be understood that the above Summary describes the invention in broad terms while the following Detailed Description describes the invention more narrowly and presents preferred embodiments that should not be construed as necessary limitations of the broad invention as defined in the claims.

DETAILED DESCRIPTION

The present invention subjects porous green bodies to an impregnation and drying treatment that adds high temperature binder material to an already formed porous green body or pre-form.

The porous green bodies are submerged in the infiltrating solution to fill their pores with the solution. The infiltrated bodies are removed from the solution and are dried in an oven using a gas sweep to remove most of the solvent from them and to then form a polymer of the pre-ceramic compound in the infiltrated bodies. The dried bodies are fired at a temperature to form fused ceramic articles containing fused material including first ceramic material derived from the inorganic source compounds fused with second ceramic material derived from the pre-ceramic compound.

The porous green bodies are formed from any batch material that includes the inorganic source materials, the binder and other processing aids such as pore formers and fillers. Suitable ceramics produced from such inorganic compounds include one or more of the following: cordierite, mullite, silicon carbide, silica, alumina, beta-spodumene, zirconia, yttrium stabilized zirconia, other metal carbides, metal nitrides, glasses, other ceramics and mixtures of any of these. Examples of suitable batch materials for forming aluminum titanate honeycomb diesel particulate filters are disclosed in U.S. Pat. No. 7,259,120, which is incorporated herein by reference. Examples of suitable batch mixtures for forming cordierite ceramic honeycombs are disclosed in U.S. Pat. Nos. 5,409,870; 7,141,089; 7,294,164; 7,309,371; and U.S. Re 38,888, which are incorporated herein by reference.

The porous green bodies can be formed by any suitable processing technique including, but not limited to, extrusion, casting, and generative fabrication manufacturing (e.g., 3-D printing). One type of suitable device for producing shaped green bodies is a 3-D printer by Z Corp. The inventive method is advantageously used with porous bodies. Both the green bodies and fired articles have a porosity ranging from 40 to 70% by volume.

The sol-gel precursor infiltrating solution is a mixture of monomers and oligomers formed by reacting pre-ceramic organometallic compounds or pre-ceramic metal salts and organic solvent in the presence of an acid catalyst. The infiltrating sol gel precursor solution is prepared by mixing metal alkoxides or alkoxides of boron, silicon, or phosphorous in organic solvent in the presence of an acid catalyst. Metal alkoxides include alkali metal, alkaline earth metal, transition metal and lanthanide metal alkoxides. It may be possible, although less desirable, to substitute a salt for a metal alkoxide or an alkoxide of boron, silicon, or phosphorous. However, the sol gel precursor solution may not be as desirable if two or more metal salts are used. Suitable alkyl groups of the alkoxides may have one to four carbon atoms. There may be one or more alkoxide compounds in the solution. For example, the solution may include at least one of magnesium alkoxide, aluminum alkoxide, silicon alkoxide, zirconium alkoxide, boron alkoxide, phosphorous alkoxide, titanium alkoxide, niobium alkoxide, tantalum alkoxide, and the like. Other alkoxide compounds and metal salts may be suitable, as would be appreciated by one of ordinary skill in the art in view of this disclosure.

A preferred silicon alkoxide compound is tetraethyl orthosilicate (TEOS). Another silicon alkoxide that may be suitable is silicon methoxide. Silicon salts should not be substituted for the silicon alkoxide. A suitable magnesium alkoxide is magnesium ethoxide, which may be replaced by magnesium nitrate. Suitable aluminum alkoxides are aluminum butoxide and aluminum isopropoxide. Methoxides and ethoxides of aluminum are not expected to be suitable. Lithium is used as a nitrate salt rather than as an alkoxide.

The metal alkoxides that are used depend upon the composition of the batch material and can be tailored to be the same as or different from the metals of the batch material. In the former case, the metals in the sol gel precursor solution can be selected via the formulation of the solution to have a molar ratio that matches the molar ratio of metals in the batch material used to make the porous green body. This will result in the fused ceramic body having a uniform composition. Alternatively, the specific mix of metals in the impregnation solution can be set (via the formulation of the solution) so that it differs significantly from the metals in the batch mixture used to form the porous green body. This may be done, for example, to enable sintering/firing at lower temperatures, or to create a fused ceramic composite material with special mechanical or other properties. Similarly, the specific mix and molar ratio of silicon, boron or phosphorus alkoxides that are used can be tailored to be the same as or different from the silicon, boron or phosphorus of the batch material.

Suitable organic solvents include alcohols having one to four carbon atoms. These alcohols may be glycols. A preferred solvent system includes both ethanol and 2-methoxy ethanol. The 2-methoxy ethanol is used to improve the stability of the sol gel precursor solution by preventing formation of metal-oxygen-metal bonds.

The acid catalyst is a strong mineral acid that volatilizes upon heating without leaving a residue. A preferred acid catalyst is aqueous nitric acid at a concentration of 60-85% by weight acid, the balance being water. The add is concentrated to minimize the water in the sol-gel precursor solution. Nitric acid has the advantage over many other acids in that it will decompose at high temperatures and leave no residue. Concentrated hydrochloric acid may be used, but this can be disadvantageous when magnesium compounds are present due to magnesium chloride formation, which is burned out with difficulty.

The sol gel precursor solution is formed by first dissolving any magnesium and aluminum alkoxides in the 2-methoxy ethanol before adding the acid solution. The silicon alkoxide is preferably added next. Ethanol is next added followed by slow addition of the aqueous acid. The magnesium and aluminum alkoxides are dissolved in the 2-methoxyethanol before the slow addition of acid to prevent gelation due to the water in the acid. Heat is added to promote the dissolution of the reactants and intermediate precipitates, as well as to facilitate acid catalysis. The solution is a mixture of oligomers and monomers including, but not limited to, alkoxide groups, hydroxy groups, and a small number of nonprecipitated metal-oxygen-metal groups. Because the sol-gel precursor is a stable homogenous solution, it is easily infiltrated into a porous body. Upon drying, the solution transforms into a polymeric material. Since this polymeric material is a pre-ceramic composed of metal-oxide-metal groups, it further transforms into ceramic crystalline or glass phases of metal oxides upon subsequent sintering/firing in air. Suitable reactants, products, and the reactions that form them are disclosed in "Sol-Gel Technology for Thin Films, Fibers, Preforms, Electrononics and Specialty Shapes," Lisa Klein, Ed., pp. 1-13 and 247-257 (1988), which is incorporated herein by reference.

The porous green bodies are dipped into the infiltrating solution and removed from solution after a period of time sufficient to displace the air in the pores of the body with the sot gel precursor solution. Because the infiltration solution is a homogeneous or true solution, not a suspension, the pores of the green bodies are rapidly filled by submerging the green bodies in the solution. The infiltration time depends on the size and geometry of the green body. Infiltration can be achieved by submerging for less than 30 seconds each time (e.g., 10 seconds each time), without the use of a vacuum or other pressure during infiltrating. The infiltration and drying steps can be carried out two or more times. The green body may be heated during forming of the batch material into a desired shape, such as at a temperature of 38° C. during 3-D printing. The green bodies subjected to various forming processes such as 3-D printing or molding, can be dried before impregnation at 85° C. for 2 hours to days. The green bodies at room temperature are submerged in the infiltrating solution that is also at room temperature. The room temperature green bodies are not subjected to heating above 150° C. and, in particular not more than 85° C., during or after infiltration and prior to firing. The infiltrating vat or bath can be enclosed to prevent loss of solvent.

The drying step is carried out in a drier or oven that permits escape or removal of the solvent from the infiltrating solution. The drier should include an air sweep for efficient solvent removal in commercial application. After most of the solvent is removed during drying, the infiltration solution is converted to a sol gel or polymer of the pre-ceramic material in the body, which has repeating metal-oxygen-metal bonds. This occurs by conversion of alkoxide groups to hydroxyl groups and hydroxyl groups to metal-oxygen-metal bonds. The green bodies have large pores on the order of at least 10 microns and small pores on the order of 4 microns or less. The polymer becomes distributed in necking regions of interparticle contact and in the small pores of the green bodies. The polymerization of the pre-ceramic compound occurs when about 80-90% of the solvent has been removed. Substantially all solvent is removed from the infiltrated bodies, and the pre-ceramic polymer is formed upon heating for about ½ hour at 85° C. The dried pre-forms can remain in the drier for days until needed, without detrimental effects. Those skilled in the art will be able to vary the time and temperature of heating in view of this disclosure depending upon variables such as product size and porosity.

The sol gel pre-ceramic polymer functions as a high temperature binder. In the drying step(s), the solution that was impregnated into the body transforms into a polymeric material, coating the particulate materials within the body. This polymeric material serves as a particle-to-particle binder in the body, and continues to work as a binder at temperatures above 400° C. One reason the invention is particularly effective is that impregnation and drying concentrates the polymeric material into necking regions between the particles and in the small pores of the green bodies where it can be most effective in improving strength of the already formed body shape. Also, the polymeric material resulting from the impregnation and drying has sintering/firing forces higher than that of the same chemical composition material in granular form. This increases the ratio of sintering/firing forces relative to gravity forces during firing and thus results in better retaining of near-net-shape.

The ceramic articles have a material volume that is changed only minimally compared to the material volume of the porous green bodies. The firing increases the ceramic density of the porous green bodies (and the material volume of the article) by not more than 30% and, in particular, not more than 15%. The fired ceramic articles as well as the unfired porous bodies have a porosity ranging from 40 to 70% by volume.

Porous body and impregnation solutions that were processed in accordance with the invention include the following exemplary combinations: a cordierite particulate plus organic binder porous body with cordierite sol-gel precursor solution;

a cordierite particulate plus organic binder porous body with silica sol-gel precursor solution; a mullite particulate plus organic binder porous body with cordierite sol-gel precursor solution; a mullite particulate plus organic binder porous body with mullite sol-gel precursor solution; a VYCOR™ (glass supplied by Corning, Inc.) particulate plus organic binder porous body with silica sol-gel precursor solution; a beta-spodumene glass particulate plus organic binder porous body with silica sol-gel precursor solution; a beta-spodumene glass particulate plus organic binder porous body with cordierite sol-gel precursor solution; a beta-spodumene glass particulate plus organic binder porous body with beta-spodumene sol-gel precursor solution; and a beta-spodumene (petalite mineral) plus organic binder with beta-spodumene sol-gel precursor solution. The cordierite, mullite, beta-spodumene and silica sol-gel precursor solutions referred to above are listed in Tables 1-4 below, respectively. The batch material used to make the porous green bodies had size distributions with >80 mass % of the particles having a size between 10 and 80 microns. The organic binder in the batch material was used in an amount of 5 to 20 wt %. These impregnation solutions used in accordance with the invention in all cases resulted in fired ceramic articles having reduced sag and distortion.

The high temperature binder material maintains strength, reduces sag and other distortion to the body that occurs during sintering/firing and gives higher body strength after firing. The pre-ceramic portion of the high temperature binder material remains in the body throughout the firing process and is converted to ceramic material that is incorporated into the fired body. Porous bodies of intricate shapes and substantial sizes (100 mm diameter×150 mm height) have been processed with the solution impregnation and drying treatment with the results of good strength and reduced sagging and other distortion (aside from shrinkage) after sintering/firing.

The invention will now be described by referring to the following non-limiting examples.

Example 1

Examples of suitable impregnation solutions given in Tables 1-4 below were prepared. The particular impregnation solution of Table 1 ("cordierite sol gel precursor") is formulated so that its molar ratios of elements Si, Mg and Al match the molar ratios that are characteristic of the mineral known as cordierite. Other suitable impregnation solutions presented are mullite sol-gel precursor solution (Table 2), beta-spodumene sol-gel precursor solution (Table 3), silica sol-gel precursor solution (Table 4), $SiO_2$/CaO sol gel precursor solution (Table 5) and zirconia with yttrium sol gel precursor solution (Table 6). Such solutions can be formulated for virtually any metal ratio mix, given the availability of the organometallic compounds and/or ionic metal salts. Although the above sol-gel precursor solutions are referred to as cordierite, mullite, silica, beta-spodumene, silica/calcia and zirconium with yttrium sol gel precursor solutions, this is intended to refer to their ability to form such ceramic phases after polymerization and completion of firing. The solutions were clear liquids that were stable for weeks or more, under conditions of being kept in closed containers that were kept at room temperature and opened for no more than a few minutes each day. Stability of the precursors for at least 5 days may be commercially suitable.

A preferred formulation recipe for the impregnation solution recipes in Tables 1-4 is: Si, Mg, Li and Al precursor materials are added in the amounts as desired for a target ceramic composition; a methoxyethanol solvent ((amount in grams)=(2190 g of methoxyethanol/mol Al)×(moles of Al)); ethanol ((amount in grams)=(756 g ethanol/mol Si)×(moles of Si)); and nitric acid ((amount in grams)=(199 g nitric acid/mol Si)×(moles of Si)). This basic formulation recipe does not have to be followed rigorously. Methoxyethanol and ethanol levels can be changed to increase or decrease viscosities, or to impact the long term stability of the solutions and/or the overall metal concentrations. The amount of nitric acid can be varied to impact the reactions and stable forms of the alkoxides in the solutions. If an impregnation solution is to be made which has little or no Si, or if the Si source is different than TEOS, then nitric acid and ethanol may have to be added in amounts different from that specified by the above basic formulation recipe. The infiltrating solution employs the pre-ceramic compounds (i.e., the metal alkoxides) in an amount effective to enable the second ceramic material derived from it to comprise 2-20% by weight of each ceramic article and, in particular, 5-10% by weight of each ceramic article.

TABLE 1

| | Cordierite Sol-Precursor Solution Recipe |
|---|---|
| 1) | 791.3 grams 2-methoxyethanol |
| | 62.5 grams magnesium ethoxide |
| | 269.4 grams aluminum butoxide |
| | Put mixture on a stir plate and start stirring |
| 2) | 283.7 grams tetraethylorthosilicate (TEOS) |
| | Add to above mixture |
| 3) | Blend the following |
| | 146.75 grams ethanol (always first) |
| | 90.24 grams nitric acid |
| | Add slowly to stirring solution |
| 4) | 197.25 grams ethanol |
| | Add to mixture, cap and stir for 16 hours at 50 C. |

TABLE 2

| | Mullite composition sol precursor |
|---|---|
| 1) | 1712 grams 2-methoxyethanol |
| | 554 grams aluminum butoxide |
| | Put mixture on a stir plate and start stirring |
| 2) | 156 grams tetraethylorthosilicate (TEOS) |
| | Add to above mixture |
| 3) | Blend the following |
| | 81 grams ethanol (always first) |
| | 50 grams nitric acid |
| | Add slowly to stirring solution |
| 4) | 109 grams ethanol |
| | Add to mixture, cap and stir for 16 hours at 50 C. |

TABLE 3

| | Beta Spodumene composition sol precursor |
|---|---|
| 1) | 489 grams 2-methoxyethanol |
| | 165 grams aluminum butoxide |
| | Put mixture on a stir plate and start stirring |
| 2) | 375 grams tetraethylorthosilicate (TEOS) |
| | Add to above mixture |
| 3) | Blend the following |
| | 194 grams ethanol (always first) |
| | 119 grams nitric acid |
| | Add slowly to stirring solution |
| 4) | 261 grams ethanol |
| | 36 grams lithium nitrate |
| | Add to mixture, cap and stir for 16 hours at 50 C. |

TABLE 4

Silica composition sol precursor 1) 791.3 grams 2-methoxyethanol
   Put on a stir plate and start stirring
2) 567.4 grams tetraethylorthosilicate (TEOS)
   Add to the 2-methoxyethanol
3) weigh out 146.75 grams of ethanol (always first)
   add 70 grams of nitric acid to the ethanol + water
   slowly add this mixture to the stirring solution
4) 197.25 grams ethanol
   Add to the stirring solution, cap and stir for 16 hrs at 50 C.

TABLE 5

$SiO_2/CaO$ glass sol precursor the solution has a 1:1 molar ratio for Si-Ca
start with 491 grams 2-methoxyethanol
add 104 grams tetraethyorthosilicate
Put mixture on a stir plate and start stirring
    2)          118 grams $CaNO_3, 4H_2O$
               Add to above mixture
    3)          Blend the following
               378 grams ethanol (always first)
               99.5 grams nitric acid
               Add slowly to stirring solution.
               cap and stir for 16 hours at 50 C.

TABLE 7

| Number of Sol treatments | weight before (grams) | as-printed bar density (g/cc) | sol weight gain (%) | % of original weight | sag (mm) | 3 point test (grams) | Bar length (mm) | bar diam (mm) | bar volume (cc) | post fire bar density (g/cc) | length shrinkage (%) | material strength (psi) |
|---|---|---|---|---|---|---|---|---|---|---|---|---|
| 0 | 4.058 | 0.991 | 0.00% | 87.8% | 1.52 | 2350 | 94.50 | 6.199 | 3.631 | 0.981 | 5.50 | 534 |
| 1 | 4.168 | 1.017 | 5.24% | 92.4% | 0.655 | 2900 | 94.87 | 6.281 | 3.743 | 1.029 | 5.13 | 634 |
| 2 | 4.014 | 0.980 | 8.94% | 95.6% | 0.545 | 2850 | 94.99 | 6.265 | 3.728 | 1.030 | 5.01 | 628 |
| 3 | 4.083 | 0.997 | 15.77% | 101.5% | 0.24 | 3350 | 95.72 | 6.264 | 3.756 | 1.105 | 4.28 | 738 |
| 4 | 3.969 | 0.969 | 16.33% | 102.0% | 0.19 | 3250 | 95.60 | 6.228 | 3.708 | 1.094 | 4.40 | 729 |

TABLE 6 zirconia wrth yttrium sol precursor

The solution has a Y:Zr molar ratio of 3:97.
start with 162 grams of ZIRCONIUM n-
PROPDXIIDE 70% (W/W) in n-PROPYL
ALCOHOL
stir in 364 grams n-mrothoxyethanol
stir in 38 grams nitric acid
stir in 435 grams Y(NO3)3:6H2O Example 2

An experiment was conducted in which sample bars were made by a 3-D printing process under the following conditions. The experiment used a Z510 3-D printer by Z Corp. In the 3-D printing process, the batch formed from a mixture of cordierite powders and binder powder (75% cordierite powder of average particle size of 15-61 microns, 12.5% cordierite powder of average particle size <15 micron, 12.5% organic binder) was applied in 100 micron thick layers. The "ink" applied between successive powder layers in the 3-D printing process was ZB-58 ink, which is a water-based ink by Z-Corp. The 3-D printing was carried out at 38° C. The green bars produced by the 3-D printing were 2" length×¼" thickness×¼" width. The green samples were subjected to 0 to 4 impregnation and drying treatments and then fired at a cycle that included a 12 hour linear ramp from 20° C. to 1400° C., a 4 hour hold at 1400° C., followed by a cool down back to 20° C.

The impregnation and drying treatment consisted of immersing a bar into the cordierite sol-precursor solution of Table 1 for 15 seconds, removing the bar from the solution and then placing the bar into an oven at 85° C. for 30 minutes. As indicated in Table 7 below, the impregnation and drying was repeated multiple times for some of the bars. During firing, the bars were positioned on ceramic blocks such that the center 40 mm lengths of the bars were unsupported.

After firing, the sag of the bars was measured. Also, the bars were each given a 3 point strength test after firing. In this test, a bar is supported at two points 40 mm apart, and a downward force is then exerted on the center of the bar and gradually increased until the bar breaks. The maximum force attained before breakage is the strength number reported in Table 7. The data of Table 7 was used to produce FIGS. 1-4.

Figure 1:
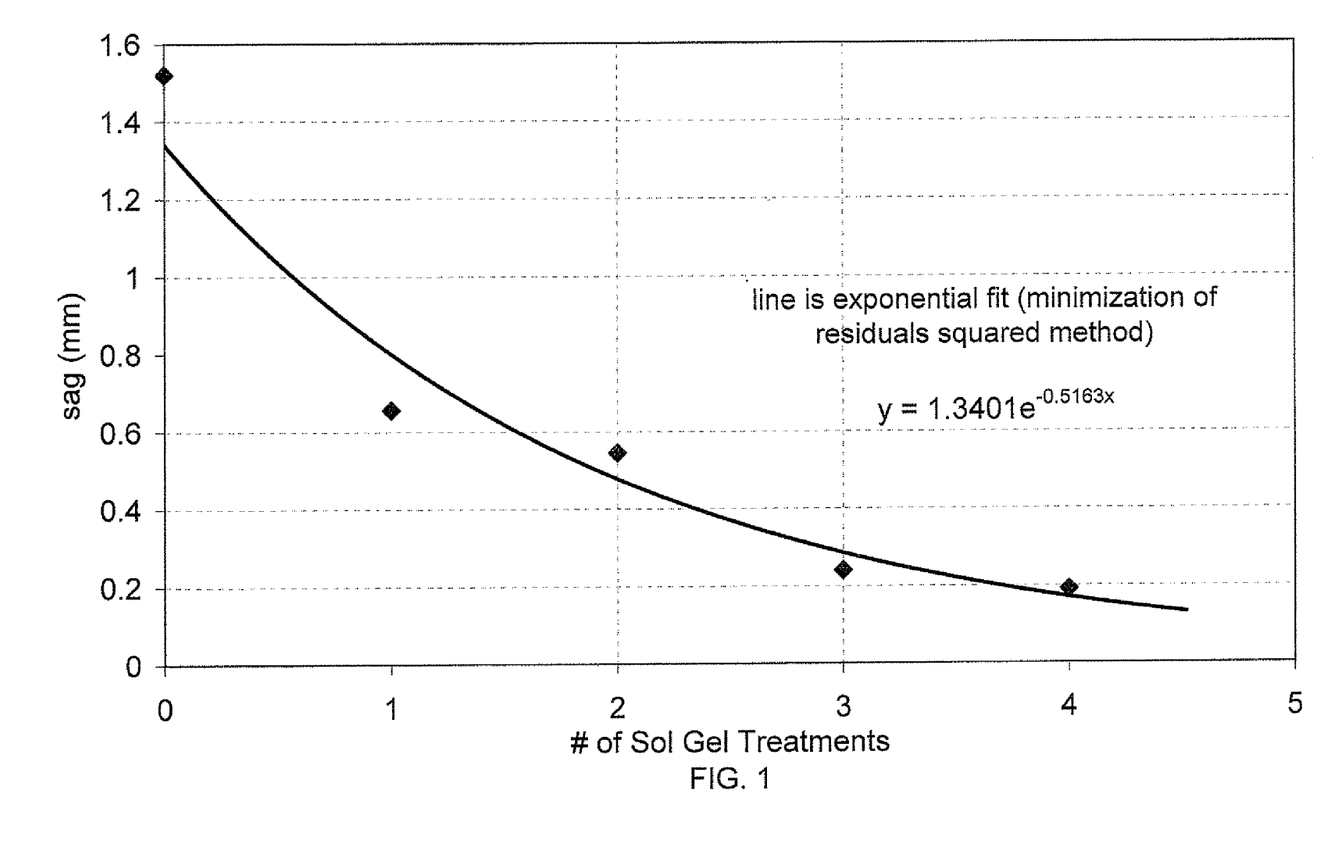
FIG. 1 shows that sagging of fired ceramic articles decreased as the number of inventive impregnation/drying steps used to form green bodies increased.
Figure 2:
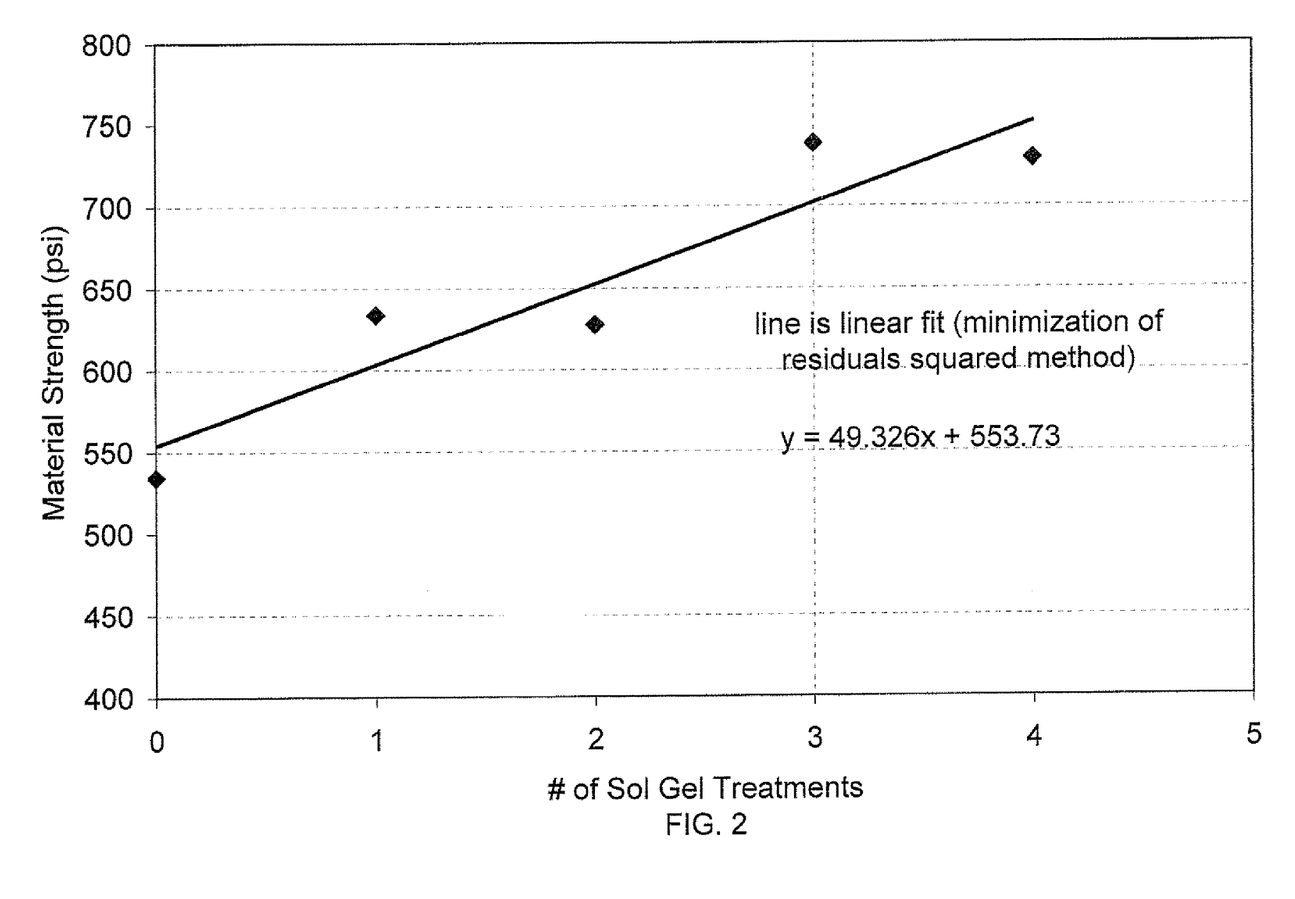
FIG. 2 shows that material strength of fired ceramic articles increased as the number of inventive impregnation/drying steps used to form green bodies increased.
Figure 3:
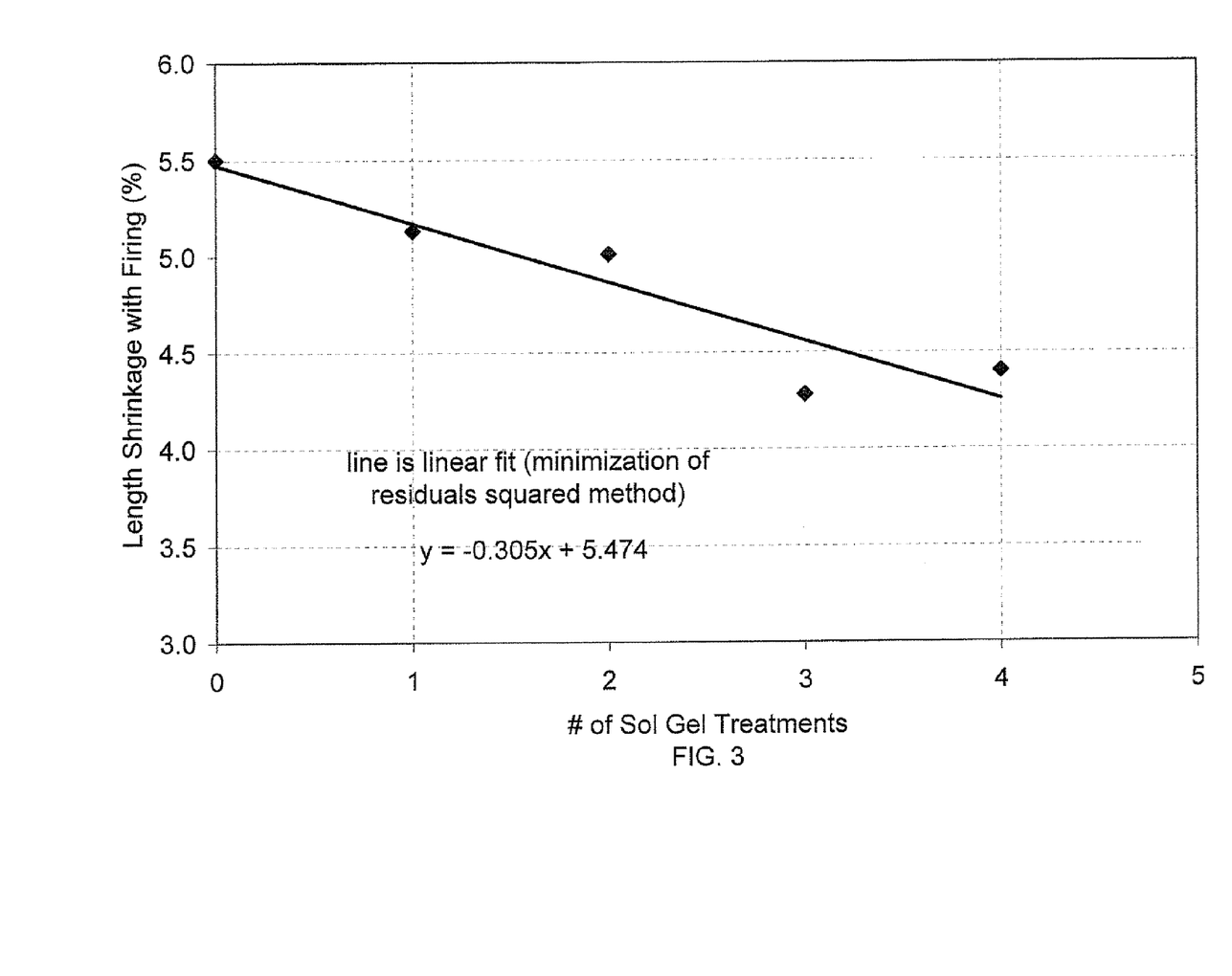
FIG. 3 shows that shrinkage of fired ceramic articles decreased as the number of inventive impregnation/drying steps used to form green bodies increased.
Figure 4:
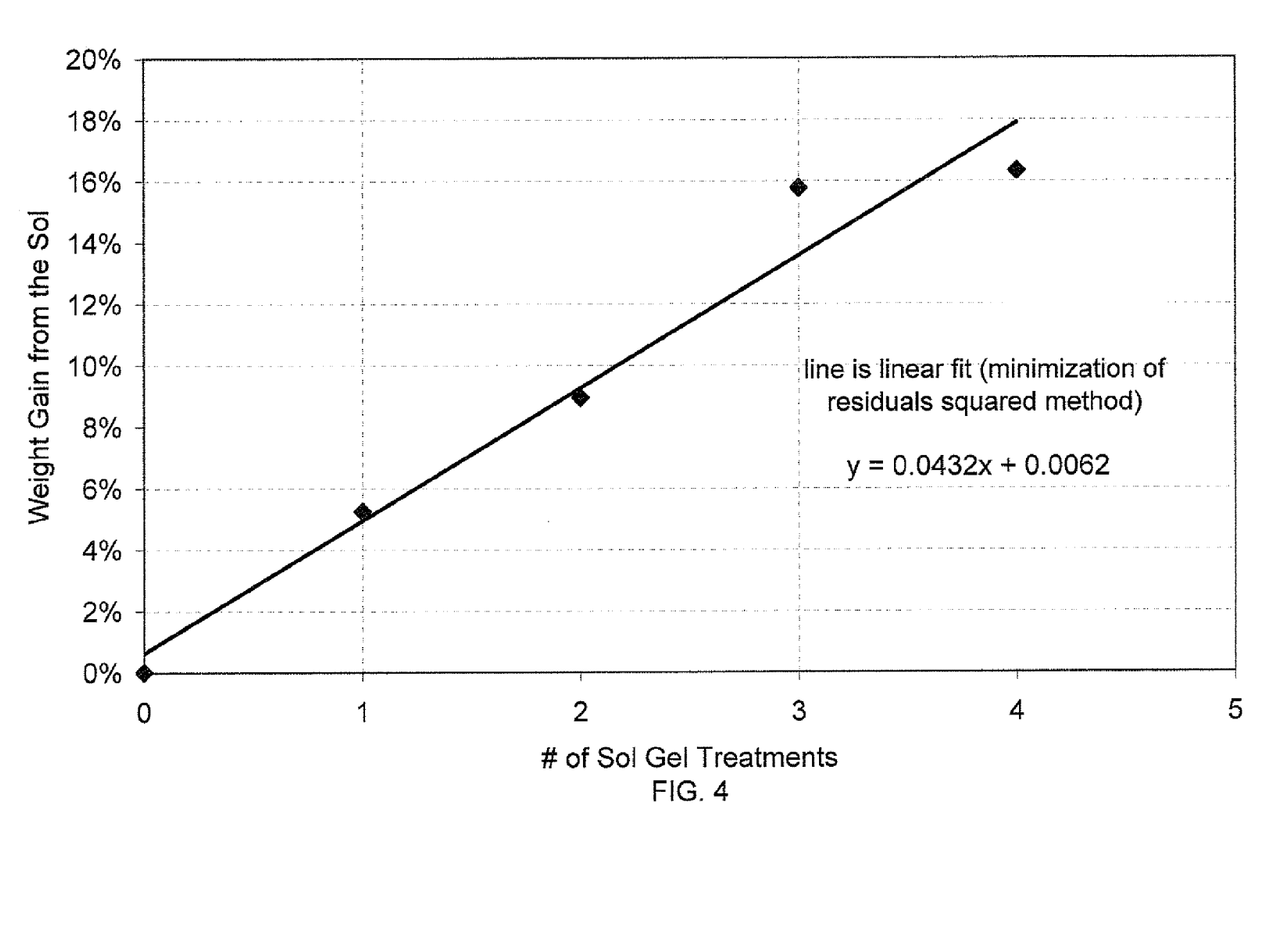
FIG. 4 shows the weight gain of fired ceramic articles due to the ceramic derived from the sol that is added in an increasing number of inventive impregnating and drying steps.

FIG. 1 shows that sag of fired samples was decreased as the number of impregnation/drying treatments was increased. Sag was decreased about 3-7 times using 2 to 4 impregnation/drying treatments compared to no treatment. FIG. 2 shows that the sample strength after firing increased as the number of treatments was increased. FIG. 3 shows that shrinkage of fired samples decreased with the number of impregnation and drying steps. FIG. 4 shows the weight gain of fired ceramic articles due to the ceramic derived from the sol that is added in an increasing number of inventive impregnating and drying steps.

Example 3

This experiment used the 3-D printing process, 3-D printer, and ink described in Example 2. In the 3-D printing process, the batch material (a mixture of beta-spodumene glass particles 95% by weight of average particle size of 25 microns and 5 wt % organic binder) was applied in 100 micron thick layers. The 3-D printing was carried out at 38° C. The green bars produced by the 3-D printing had dimensions of 2" length×¼" thickness×¼" width, and had 60% porosity.

The green sample bars were processed either with or without a treatment of impregnating and drying (twice) before firing to study the effects on sagging, shrinkage and strength. Samples 1-3, 6 and 7 of Table 8 were impregnated using the impregnation solution specified in Table 3. The samples were impregnated and dried twice. The samples were submerged for 10 seconds in the sol-gel precursor solution, removed from solution and then dried at 85° C. for 30 min in an unsealed oven with air recirculation permitting escape of solvent. Samples 4 and 5 of Table 8 received no treatment. During firing, the bars were positioned on ceramic blocks such that the center 40 mm lengths of the bars were unsupported.

The volumetric shrinkage of the samples disclosed herein was the change in the measured volume of the fired samples compared to the volume of the samples measured before firing. The linear shrinkage of the samples=1-(1-volumetric shrinkage)$^{1/3}$.

layers. The 3-D printing was carried out at 38° C. The green bars produced by the 3-D printing had dimensions of 2×¼×¼ (inches).

Samples in Group 1 of Table 9 below were treated using the inventive method (without the indicated humid-curing step) in which the impregnated samples were dried to remove solvent and the concentrated sol gel precursor solution polymerized or gelled during drying. All of the samples were impregnated only once. Samples in Group 2 of Table 9 were produced for comparison using a humid-curing step in which samples were placed in a humidity vapor chamber in an oven. The samples were supported above 40 g of water in the

TABLE 8

| sample | print run | firing cycle | protein binder | impregnation and drying | volume shrinkage on fire | strength after fire (grams) | sag with firing (mm) | liner shrinkage with firing | density after fire (g/cc) |
|---|---|---|---|---|---|---|---|---|---|
| 1 | Oct. 16, 2007 | 1300, 10 hr | 5% | beta-spodumene sol | 2.1% | 1590 | 0.28 | 0.7% | 1.02 |
| 2 | Oct. 16, 2007 | 1300, 10 hr | 5% | precursor, impregnate | 2.3% | 1500 | 0.21 | 0.8% | 1.03 |
| 3 | Oct. 16, 2007 | 1300, 10 hr | 5% | and dry two times | 2.7% | | 0.49 | 0.9% | 1.05 |
| 4 | Oct. 16, 2007 | 1300, 10 hr | 5% | none | | 380 | 4.85 | | 1.03 |
| 5 | Oct. 16, 2007 | 1300, 10 hr | 5% | | | | 5.54 | | 0.99 |
| 6 | Oct. 16, 2007 | 1350, 4 hr | 5% | beta-spodumene sol | 6.3% | 3500 | 0.22 | 2.2% | 1.09 |
| 7 | Oct. 16, 2007 | 1350, 4 hr | 5% | precursor, two times | 6.7% | 3600 | 0.37 | 2.3% | 1.14 |

Table 8 shows that sag was decreased 90 to 95% with the treatments versus untreated samples. The data also show that the sample strength after sintering/firing is greatly increased with the treatments. With the same firing cycle, sag is decreased by 10 to 20 fold with the treatment versus untreated samples. The strength after firing is increased four fold, and, using a different firing cycle, strength is further increased and sag is not significantly changed.

Example 4

The significance of the presence of solvent during curing of the sol gel precursor solution was investigated. The experiment used the 3-D printing process, 3-D printer, and ink described in Example 2. In the 3-D printing process, the batch material (93 wt % cordierite powder of average particle size 5 to 75 microns and 7 wt % organic binder powder of average particle size 5 to 75 microns) was applied in 100 micron thick chamber having a volume of about 1 liter. The humid-cure step lasted one hour at 85° C. Water remained below the samples after heating in the vapor chamber, curing occurred in the presence of high humidity and solvent levels.

The samples of both Groups 1 and 2 were dried. The humid-cured Group 2 samples were placed in an 85° C. drying oven directly after curing. The inventive Group 1 samples (not humid-cured) were placed in the 85° C. oven directly after impregnation. All samples were dried in the 85° C. oven overnight. The oven used for drying was not sealed and had recirculating air, and thus permitted loss of solvents from the samples. Modulus of rupture (MOR) or material strength was obtained using the 3-point bend test of Example 2. Porosity of green and fired bodies is calculated as 1−(measured density/theoretical density). Sagging was determined as explained in Example 3. The results are listed in Table 9 below.

TABLE 9

| | sample | cordierite sol impreg | cure step | linear shrinkage in impreg/dry | linear shrinkage in firing | total linear shrinkage | density after firing (g/cm3) | porosity after firing | impreg/ dry MOR (psi) | fired MOR (psi) | sag in firing (mm) |
|---|---|---|---|---|---|---|---|---|---|---|---|
| sample group #1 | A-2 | 10 sec dip | none | 0.2% | 3.8% | 4.0% | 1.04 | 59% | | 810 | |
| | B-2 | 10 sec dip | none | 0.1% | 3.7% | 3.8% | 1.05 | 58% | | 840 | |
| | C-1 | 10 sec dip | none | 0.1% | | | | | 680 | | |
| | E-2 | 10 sec dip | none | −0.6% | 4.5% | 3.9% | 0.98 | 61% | | 820 | 0.67 |
| | F-2 | 10 sec dip | none | 0.0% | 4.6% | 4.6% | 1.02 | 59% | | 820 | 0.76 |
| average | | | | 0.0% | 4.1% | 4.1% | 1.02 | 59% | | 823 | 0.72 |
| sample group #2 | A-1 | 10 sec dip | yes* | 1.7% | 3.5% | 5.2% | 1.07 | 57% | | 840 | |
| | B-1 | 10 sec dip | yes* | 1.7% | 3.4% | 5.0% | 1.08 | 57% | | 870 | |
| | D-1 | 10 sec dip | yes* | 2.7% | | | | | 670 | | |
| | E-1 | 10 sec dip | yes* | 3.1% | 4.4% | 7.4% | 1.07 | 57% | | 960 | 0.86 |
| | F-1 | 10 sec dip | yes* | 2.5% | 4.7% | 7.0% | 1.09 | 56% | | 990 | 0.98 |
| average | | | | 2.3% | 4.0% | 6.2% | 1.08 | 57% | | 915 | 0.92 |
| sample group #3 | C-2 | none | none | 0.2% | | | | | 460 | | |
| | D-2 | none | none | 0.0% | 4.3% | 4.2% | 0.93 | 63% | | 540 | |

The data in Table 9 show that advantageous effects of the invention occur with substantial removal of solvents from the infiltrated solution prior to formation of the sol gel versus forming the pre-ceramic polymer without first removing the solvents.

In the invention, both solvent removal and formation of the sol gel occur in the drying step. We have determined by experiment that, with the method of the invention, about 80% of the volume of the solvent evaporates prior to the formation of the sol gel. This experiment involved placing an open graduated beaker containing 100 ml of infiltrant solution into an 85° C. oven with air venting. The experiment showed that the formation of the sol gel (evident as transformation of the remaining liquid into a gel) did not occur until the liquid volume decreased by 80%.

The "humid curing" method was devised to effect the formation of the sol gel prior to any substantial evaporation of solvent from the infiltrant. Humid curing was done by placing an infiltrated sample into a closed small volume container that had liquid water present and that was maintained at 85° C. The water vapor caused rapid formation of the pre-ceramic polymer. The closed container prevented appreciable evaporation of solvents. The effectiveness of the humid curing method was demonstrated with a small beaker of infiltrant. Under humid curing, the infiltrant in the beaker transformed to a gel within 30 minutes with no appreciable loss of solvents.

Sample Group 2 in Table 9 received humid curing treatment and were then dried. Sample Group 1 in Table 9 saw the drying treatment of the invention. The humid-cured samples exhibited 2% more shrinkage in drying, which led to about 2% higher average fired density. This additional drying shrinkage using the humid cure step may lead to cracking in large parts. The inventive samples of Group 1 had about 20% less sag in firing.

The explanation for reduced shrinkage in the case of the invention versus the case of forming the sol gel before drying is as follows. A sol gel has pores of a size on the order of magnitude of 10 nanometers. This small pore size creates large capillary forces when the solvents are removed from the gel. These forces normally lead to high shrinkage. In the case of curing before removing solvents, the pores of the infiltrated green body became 100% filled with the sol gel. When the solvent is evaporated from the sol gel the high shrinkage of the gel drives significant shrinkage of the green body. In the case of the invention about 80% of the volume of the infiltrant evaporates before a sol gel is formed, so that only about 20% of the pore volume of the green body becomes filled with gel. While not wanting to be bound by theory, it is believed that because the pore volume of the body is largely unfilled with sol gel the shrinkage of the sol gel upon drying does not drive significant shrinkage of the green body.

Example 5

This experiment was conducted to compare the effects of forming a polymer ("gelling") of the impregnated solution in a humid atmosphere in the presence of solvent ("humid curing" "Treatment 1") compared to the invention in which a polymer of the impregnated solution is formed during drying while solvent is removed (inventive "Treatment 2"). The Treatment 1 samples were not dried prior to firing.

The experiment used 8 bars made using the 3-D printing process, 3-D printer, and ink described in Example 2. The bars were composed of a powder that was 93 wt % cordierite powder of average particle size 5 to 75 microns and 7 wt % organic binder powder of average particle size 5 to 75 microns. In the 3-D printing process, the powder batch material was applied in 100 micron thick layers. The 3-D printing was carried out at 38° C. The resulting green bar dimensions were 10 cm×0.66 cm×0.66 cm (+/−0.05 cm). The bar material porosity was 60% (+/−5%). The eight bars were labeled A thru H. Each bar was cut into two samples each of length 4.8 cm (+/−0.2 cm), and the halves were given "−1" and "−2" label suffixes. The "no treatment" group of samples received no processing prior to firing.

In Table 10 below, Treatment 1 (impregnate then humid curing) and the inventive Treatment 2 (impregnate then drying/curing) groups of samples were dipped for 10 seconds in to a cordierite sol-precursor solution for impregnation (Table 1). Immediately after impregnation, the Treatment 1 group was removed from the solution and put into an 85° C. humidity chamber for 1 hour in which samples were supported above water in the bottom of the chamber. Immediately after impregnation the Treatment 2 group of samples were removed form the solution and dried in an 85° C. open air oven for 1 hour.

The Treatment 1 samples were processed to cause the gelation of the impregnated solution without appreciable solvent evaporation. The inventive Treatment 2 samples were processed to cause drying (the evaporation of most of the solvents of the impregnated solution) followed by gelation of the remaining concentrated solution.

Immediately after the humid-curing (Treatment 1) or drying/curing (Treatment 2) treatments, all samples were positioned onto end support blocks so that a 40 mm mid section of each sample was unsupported. The samples were then fired at a cycle that included a 12 hour linear ramp from 20° C. to 1410° C., a 4 hour hold at 1410° C., followed by a 4 hour cool down back to 20° C. Sagging and strength were measured as described in Example 3. The results are listed in Table 10 below.

TABLE 10

| sample | process | green dens (g/cm3) | fired dens (g/cm3) | volume shrinkage | fired str (psi) | sag (cm) | delta fired density | delta volume shrinkage | delta fired str (psi) | delta sag |
|---|---|---|---|---|---|---|---|---|---|---|
| Treatment 1 versus no treatment, paired samples comparison | | | | | | | | | | |
| A2 | no treatment | 0.908 | 0.973 | 12.8% | 489 | 1.225 | 8% | 3% | 24% | −37% |
| A1 | treatment 1 | 0.903 | 1.047 | 15.5% | 605 | 0.770 | | | | |
| E2 | no treatment | 0.905 | 0.975 | 13.2% | 445 | 1.305 | 8% | 2% | 32% | −38% |
| E1 | treatment 1 | 0.911 | 1.056 | 15.7% | 587 | 0.810 | | | | |
| Treatment 2 versus no treatment, paired samples comparison | | | | | | | | | | |
| B1 | no treatment | 0.961 | 1.000 | 10.6% | 463 | 1.160 | 5% | 1% | 40% | −57% |
| B2 | treatment 2 | 0.943 | 1.048 | 11.5% | 650 | 0.495 | | | | |

TABLE 10-continued

| sample | process | green dens (g/cm3) | fired dens (g/cm3) | volume shrinkage | fired str (psi) | sag (cm) | delta fired density | delta volume shrinkage | delta fired str (psi) | delta sag |
|---|---|---|---|---|---|---|---|---|---|---|
| D1 | no treatment | 0.902 | 0.973 | 13.6% | 490 | 1.355 | 4% | −2% | 47% | −52% |
| D2 | treatment 2 | 0.908 | 1.015 | 11.9% | 720 | 0.655 | | | | |
| | | Treatment 2 versus treatment 1, paired samples comparison | | | | | | | | |
| C1 | treatment 1 | 0.926 | 1.046 | 13.0% | 690 | 0.650 | −1% | −1% | 7% | −49% |
| C2 | treatment 2 | 0.916 | 1.034 | 12.4% | 739 | 0.333 | | | | |
| F1 | treatment 1 | 1.068 | 1.100 | 12.3% | 834 | 0.270 | −2% | −2% | −5% | −34% |
| F2 | treatment 2 | 1.067 | 1.079 | 10.1% | 794 | 0.177 | | | | |
| G1 | treatment 1 | 0.904 | 1.067 | 17.3% | 612 | 0.755 | −7% | −6% | 0% | −35% |
| G2 | treatment 2 | 0.910 | 0.997 | 11.2% | 609 | 0.493 | | | | |
| H1 | treatment 1 | 0.924 | 1.064 | 15.3% | 600 | 1.055 | −6% | −5% | 12% | −55% |
| H2 | treatment 2 | 0.917 | 1.000 | 10.6% | 671 | 0.470 | | | | |

From the data in Table 10, it is seen that all of the inventive Treatment 2 samples had substantially less sag (at least 30% less sag) and less volumetric shrinkage than the humid-cured samples of Treatment 1. In addition, in all but one of the inventive Treatment 2 samples, strength was not less than the Treatment 1 samples.

Example 6

An experiment was conducted to determine the effects of the inventive method on pre-formed green bodies made by molding. The batch material of Samples 1-11 had the following composition: 7 wt % organic binder (200-500 mesh), Cast Rite carbon pore former (200-500 mesh) at levels indicated in the table (0 or 18 wt %), the balance being cordierite source material (80-87 wt % 200-500 mesh, 13-20 wt %<15 microns average particle size). The batch material of Samples 12 and 13 had the following composition: 12.5% organic binder, the balance being cordierite source material (80-87 wt % 200-500 mesh, 13-20 wt %<15 microns average particle size).

Water was added to the batch material to make a paste, which was placed into molds. Water was removed by evaporative drying. Some of the resulting green bodies were treated by impregnating with the cordierite sol-precursor solution (Table 1) by dipping in the solution for 10 seconds; and upon removal from the solution, the green bodies were dried for 30 min at 85° C. The impregnating and drying steps were repeated. Other samples did not receive this impregnation and drying treatment. All samples were fired for 12 hours with a linear ramp from 20° C. to 1410° C., a 4 hour hold at 1400° C., and then 4 hour cool down to 20° C. The results are listed in Table 11 below.

TABLE 11

| sample | forming method | carbon level (wt % of solids) | impreg & dry | green porosity | fired density (g/cm$^3$) | fired porosity | linear shrinkage | fired sag** (mm) | fired str (psi) |
|---|---|---|---|---|---|---|---|---|---|
| 1 | Mold | 0% | 2x | 53% | 1.28 | 49% | 4.9% | | 1450 |
| 2 | Mold | 0% | none | 52% | 1.27 | 49% | 5.0% | 0.4 | 1430 |
| 3 | Mold | 0% | none | 52% | 1.30 | 48% | 5.3% | 0.6 | 1510 |
| 4 | Mold | 0% | 2x | 53% | 1.32 | 47% | 4.6% | 0.2 | 1420 |
| 5 | Mold | 18% | 2x | 52% | 0.89 | 65% | 4.3% | 1.2 | 350 |
| 6 | Mold | 18% | none | 50% | 0.92 | 63% | 5.8% | 3.4 | 220 |
| 7 | Mold | 18% | 2x | 50% | 0.91 | 64% | 4.2% | 0.9 | 440 |
| 8 | Mold | 18% | 2x | 51% | 0.91 | 64% | 4.4% | 1.0 | 520 |
| 9 | Mold | 18% | none | 50% | 0.86 | 65% | 4.4% | | 0.0* |
| 10 | Mold | 18% | none | 50% | 0.89 | 65% | 5.2% | | 0.0* |
| 11 | Mold | 18% | 2x | 50% | 0.92 | 63% | 4.2% | 1.2 | 340 |
| 12 | 3DP | 0.00 | none | 60% | 0.98 | 61% | 5.5% | 1.5 | 800 |
| 13 | 3DP | 0% | 2x | 58% | 1.04 | 58% | 5.0% | 0.7 | 970 |

*these samples broke into 2-3 pieces in firing
**sag for 6.2 × 6.2 mm cross-section sample bars spanned 40 mm The data show that the impregnation and drying steps resulted in the treated samples having reduced sag compared to untreated samples in all three groups (molded samples having compositions without pore former, molded samples having compositions with pore former, and 3-D printed samples). Treated molded sample 4 had lower sag than untreated molded samples 2 and 3 using batch compositions having no pore former. Of the compositions having pore former, treated molded samples 5, 7, 8 and 11 had lower sag than untreated molded sample 6. Untreated molded samples 9 and 10, using a composition with pore former, broke during firing. Treated sample 13 produced by 3-D printing, had lower sag than untreated sample 12 produced the same way. The treated samples had the same or lower linear shrinkage than the untreated samples.

Referring to molded samples, the samples that had pore former in their batch composition (samples 5-11) had a substantially higher fired porosity and a lower linear shrinkage than the samples without pore former (samples 1-4).

Of samples having at least 50% fired porosity, treated samples exhibited a higher strength than untreated samples. Treated molded samples, 5, 7, 8 and 11 had higher strength than untreated samples 6, 9 and 10. Treated 3-D printed sample 13 had a higher strength than untreated 3-D printed sample 12.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of forming fused ceramic articles comprising:
   providing shaped porous green bodies of particulate batch material, said batch material including inorganic source compounds and binder;
   forming a homogeneous infiltrating solution which is a sol gel precursor mixture of monomers and oligomers by reacting pre-ceramic organometallic compounds or pre-ceramic metal salts and an organic solvent in the presence of an acid catalyst;
   infiltrating said porous green bodies with said infiltrating solution to form infiltrated bodies having pores filled with said infiltrating solution, wherein said pores are filled with said infiltrating solution without applying pressure by submerging said porous bodies in said infiltrating solution for not more than 1 minute;
   drying said infiltrated bodies to remove most of said solvent from said infiltrated bodies and then to form a polymer of said pre-ceramic compound in said infiltrated bodies to form dried bodies, wherein said polymer does not form until about 80 volume of said organic solvent evaporates; and
   firing said dried bodies at a temperature to form fused ceramic articles including a first ceramic material derived from said inorganic source compounds and a second ceramic material derived from said pre-ceramic compound,
   wherein said infiltrating solution employs said pre-ceramic compound in an amount effective to enable said second ceramic material to comprise 2-20% by weight of said fused ceramic article.

2. The method of claim 1, wherein said porous bodies are submerged in said infiltrating solution for not more than 30 seconds.

3. The method of claim 2, wherein said porous bodies are submerged in said infiltrating solution for about 10 seconds.

4. The method of claim 1, wherein said organometallic compounds are selected from the group consisting of metal alkoxides, boron alkoxides, silicon alkoxides and phosphorous alkoxides.

5. The method of claim 4, wherein said metal salts include at least one of magnesium nitrate, lithium nitrate, calcium nitrate hydrate and yttrium nitrate hydrate.

6. The method of claim 4, wherein said solvent includes at least one of 2-methoxyethanol, ethanol and n-propyl alcohol.

7. The method of claim 4, wherein said acid catalyst is an aqueous nitric acid solution containing 60-85 weight % nitric acid.

8. The method of claim 1, wherein said infiltrating solution employs said pre-ceramic compound in an amount effective to enable said second ceramic material to comprise 5-10% by weight of said fused ceramic article.

9. The method of claim 1, wherein said firing decreases a volume of said porous green bodies by not more than 30%.

10. The method of claim 1, wherein said firing decreases a volume of said porous green bodies by not more than 15%.

11. The method of claim 1, wherein said submersing and drying steps increase a fired material bend strength of said ceramic articles by at least 40% compared to a fired material bend strength of ceramic articles produced without said submerging and drying steps.

12. The method of claim 1, wherein said submersing and drying steps increase a fired material bend strength of said ceramic articles by at least 300% compared to a fired material bend strength of ceramic articles produced without said submerging and drying steps.

13. The method of claim 1, wherein said submersing and drying steps decrease a sagging after firing of said ceramic articles by at least 50% compared to sagging of ceramic articles produced without said submerging and drying steps.

14. The method of claim 1, wherein distortion and linear shrinkage of said ceramic articles are each not more than 5%.

15. The method of claim 1, wherein said drying step removes said organic solvent in an oven using a gas sweep.

16. The method of claim 1, wherein during said drying step said polymer is formed in necking regions between contiguous particles and in small pores of said infiltrated bodies.

17. The method of claim 1, wherein said fused ceramic articles have an increased porosity of between 0% to 26% after said submerging, drying, and firing steps compared the porosity of said shaped porous green bodies.

18. The method of claim 1, wherein said fused ceramic articles have a fired porosity of at least 50% following said submerging and drying steps.

19. The method of claim 18, wherein said ceramic articles have an increased fired material bend strength compared to a bend strength of ceramic articles produced without said submerging and drying steps.

20. The method of claim 1, wherein about 20% pore volume of said green bodies is filled with said polymer after said drying step.

* * * * *